United States Patent [19]

Wiedmann et al.

[11] Patent Number: 4,605,444
[45] Date of Patent: Aug. 12, 1986

[54] PROCESSES FOR PREPARING CASEINATES

[75] Inventors: Werner Wiedmann; Christian Millauer, both of Stuttgart, Fed. Rep. of Germany

[73] Assignee: Werner & Pfleiderer, Fed. Rep. of Germany

[21] Appl. No.: 664,160

[22] Filed: Oct. 24, 1984

[30] Foreign Application Priority Data

Nov. 5, 1983 [DE] Fed. Rep. of Germany ....... 3340116

[51] Int. Cl.$^4$ ............................ C08L 89/00; B28B 3/20
[52] U.S. Cl. ..................................... 106/138; 530/360; 530/427; 264/53; 264/176 R
[58] Field of Search ....................... 106/138, 210, 213; 260/119; 425/204; 264/176 R, 53

[56] References Cited

U.S. PATENT DOCUMENTS

| | | | |
|---|---|---|---|
| 2,005,730 | 6/1935 | Dunham | 106/138 |
| 2,103,153 | 12/1937 | Dunham | 260/119 |
| 3,137,592 | 6/1964 | Protzman et al. | 127/32 |
| 3,440,054 | 4/1969 | Sair | 260/119 |
| 3,843,757 | 10/1974 | Ehrenfreund | 425/204 |
| 4,482,386 | 11/1984 | Wittwer | 106/213 |

FOREIGN PATENT DOCUMENTS 0021949 9/1983 European Pat. Off. .

OTHER PUBLICATIONS

Chem. Abst. 61: 15690d., Arima, 1964.

Primary Examiner—Theodore Morris
Attorney, Agent, or Firm—Laff, Whitesel, Conte & Saret

[57] ABSTRACT

In a process for preparing caseinates comprising the introduction of a mixture of casein, lyes and/or basic salts and water into a baking extruding device, in order to achieve a uniform product flow discharge and an end product with good water solubility, following on from a product feed zone of the baking extruding device, the mixture is supplied to a plasticizing zone with return elements and accompanied by pressure and temperature increases, and then to a discharge zone, it being expanded after discharge from the nozzle.

9 Claims, No Drawings

PROCESSES FOR PREPARING CASEINATES

FIELD OF THE INVENTION

This invention relates to a process for preparing caseinates in which a mixture of casein, lyes and/or basic salts, and water is introduced into a baking extruding device. Such processes are known from U.S. Pat. No. 2,005,730 and European Patent Specification No. 0021949.

BACKGROUND OF THE INVENTION

According to U.S. Pat. No. 2,005,730, a mixture of casein, lyes, and/or basic salts and water is introduced into a kneading and extruding device, heat being supplied from the outside to the latter. The initial moisture content is approximately 30%. The product undergoes a relatively small temperature rising during extrusion. The starting product correspondingly has a relatively high moisture content and a pasty consistency. As a result, the extruded product can only be ground with difficulty or not at all and the water solubility is unsatisfactory.

European Patent Specification No. 0021949 describes a corresponding process, in which the intial moisture content is approximately 10%, and a pressure between 15 and 150 kg/cm$^2$ at temperatures of 30° to 90° C. is applied for between 10 seconds and 1 minute to the mixture of the starting components. As a result of this very low water content, local scorching and brown discolourations can occur. The relatively high residence time under high pressure leads to greater wear and to product damage, whilst the low temperatures can cause incomplete reactions and a lack of product sterilization. In addition, after extrusion, the product is difficult to grind.

SUMMARY OF THE INVENTION

The object of the invention is therefore to so develop such a process that with uniform product flow discharge, an end product is obtained, which can be finely ground and has a very good water solubility.

Accordingly, the present invention provides a process for the preparation of caseinates, comprising introducing a mixture of casein, at least one of lyes and basic salts, and water into a product feed zone of a baking extruding device, supplying the mixture to a plasticizing zone with return elements and accompanied by pressure and temperature increases, and then supplying the mixture to a discharge zone having a nozzle, expanding of the mixture taking place after leaving the nozzle. Owing to the fact that, after the feed zone, the mixture is supplied to a plasticizing zone and traverses the latter for a relatively short time, a particularly good consistency of the end product and at the same time careful treatment are achieved.

The initial moisture content of the mixture is preferably approximately 15 to 20%. This ensures that on the one hand no heat damage occurs due to excessive dryness of the starting product and that on the other hand no complicated redrying is required due to an excessive initial moisture content. Particularly through the combination of the initial moisture content range according to the invention and the provision of a plasticizing zone, a clean nozzle flow and an end product with surprising advantageous properties are obtained.

A temperature of 100° to 110° C. and a pressure of 6 to 10 bars are desirably set in the plasticizing zone since these values have been found to be particularly favourable. The mixture is desirably held in the plasticizing zone for 0.5 to 1.5 seconds after reaching a temperature over 100° C.

The temperature of 110° to 180° C. is desirably set in the discharge zone in order to ensure product sterilization.

This temperature rise can either be brought about by introducing superheated steam, or by introducing shear forces.

Advantageously the temperature of the casing of the baking extruding device is kept at approximately 40° C.

The extruded product is desirably expanded 18 to 22 times. This setting of the expansion after the product has passed out of the extrusion nozzle ensures particularly good product characteristics and careful grinding.

The expanded product is preferably continuously after-dried by infra-red lamps. This makes it possible to set a clearly defined residual moisture content and particularly obtain a foamy structure without involving great expenditure and effort.

DESCRIPTION OF PREFERRED EMBODIMENT

The process according to the invention will now be described in greater detail relative to an embodiment.

The baking extruding device used is a twin-screw extruder with rotation in the same direction. The length: diameter ratio of the screws is 12. Following on from a feed zone with conventional feed screw lands, the screws have a zone with return elements, so that a plasticizing zone is formed in this area. The screws are driven at a speed of 217 revolutions per minute. The casing is temperature-controlled to approximately 40° C. by means of a double jacket.

The following flow rates are set:
Dry casein powder with 10% moisture: 20 kg/h
40% caustic soda solution with 60% water: 1.5 kg/h
Water: 1.3 kg/h This gives an overall flow rate of 22.8 kg/h, with an initial moisture content of 19%.

The components are metered in a first casing zone viewed in the feed direction, namely the feed zone. The components are plasticized and reacted in a second and third casing zone, namely the plasticizing and discharge zone. In the discharge zone there is also an after-heating with steam and then discharge through a 5 mm diameter nozzle.

In the plasticizing zone, shear forces are introduced into the product mix (0.1 kWh/kg) up to a temperature peak of 105° C. in the case of a preceding pressure peak of 10 bars and a residence time of approximately 1 sec.

In the discharge zone, 1 kg/h of steam with a pressure of 5 bars and a temperature of 150° C. is injected, in order to heat the reacted caseinate up to 140° C. and consequently sterilize the same.

On discharge from the nozzle, 10% of the water evaporates, and a 20 times expanded, white product is obtained. This is subsequently subjected to continuous after-drying by an infra-red lamp.

The end product has a porous structure, so that the grinding process is facilitated and a 99.5% cold water-soluble end product can be obtained.

The invention is not restricted to the above-described embodiment but modifications and variations may be made without departing from the spirit and scope of the invention as defined by the appended claims.

We claim:

1. In a process for the preparation of caseinates wherein, casein, water, and at least one compound selected from lyes and basic salts and water are fed to a baking extruding device with a product being formed under increased pressure and increased temperature and being expanded after discharge from the extruding device, the process comprises providing a twin-screw extruder with rotation in the same direction and having a product feed zone, a plasticizing zone and a discharge zone, feeding single components separately into said product feed zone to prepare a product mixture, maintaining a temperature in the plasticizing zone of greater than 100° C. by subjecting said mixture to return elements, maintaining a temperature in the range of 110° to 180° C. in the discharge zone and maintaining a residence time for the product mixture in the plasticizing zone of 0.5 to 1.5 sec.

2. A process as claimed in claim 1, in which the initial moisture content of said mixture is approximately 15 to 20%.

3. A process as claimed in claim 1, in which a temperature of 100° to 110° C. is set in the plasticizing zone.

4. A process as claimed in claim 1, in which a pressure of 6 to 10 bars is set in the plasticizing zone.

5. A process as claimed in claim 1, in which the temperature is set by introducing superheated steam.

6. A process as claimed in claim 1, in which the temperature is set by introducing shear forces.

7. A process as claimed in claim 1, in which the casing temperature is kept at approximately 40° C.

8. A process as claimed in claim 1, in which the extruded product is expanded 10 to 22 times.

9. A process as claimed in claim 1, in which the expanded product is continuously after-dried by infra-red lamps.

* * * * *